UNITED STATES PATENT OFFICE.

RICHARD CHRISTIAN WILHELM NÖHRING, OF KOSWIG, GERMANY.

THERAPEUTICALLY-ACTIVE SUBSTANCE.

1,204,479. Specification of Letters Patent. Patented Nov. 14, 1916.

No Drawing. Application filed May 22, 1914. Serial No. 840,368.

*To all whom it may concern:*

Be it known that I, Dr. RICHARD CHRISTIAN WILHELM NÖHRING, citizen of the German Empire, and resident of Koswig, in the Kingdom of Saxony, Germany, have invented new and useful Improvements in Therapeutically-Active Substances, of which the following is a specification.

Bile consists of a mixture of substances in part known and in part unknown. The total mixture of these substances is toxic for the animal organism.

The present invention relates to a process for isolating the therapeutically valuable substances from bile.

It consists in mixing the fresh bile, preferably in diluted condition, with acid, filtering from the precipitated dyestuff and other materials, and separating from the filtrate the active substance in a solid form by adding alkali. The product thus obtained is practically without poisonous action on the normal organism, while it has toxic effects on organisms which are pathologically altered; for instance in the case of organisms suffering from tuberculosis the toxic effect manifests a pronounced reaction for the foci.

The following example illustrates the invention: 100 grams of bile diluted with 400 grams of water are mixed with 20 grams of hydrochloric acid, the mixture is filtered and the desired substance is precipitated from the filtrate by addition of caustic soda lye. The active substance separates in the form of a precipitate and is obtained as a light brown powder by filtration, re-solution in hydrochloric acid followed by re-precipitation with caustic soda lye and washing with distilled water.

Instead of caustic soda lye other alkalis or bases may be used for the precipitation.

As indicated, the resultant substance is particularly beneficial as a remedy for tubercular and catarrhal affections, not only serving to effectively dispose of the germs of these diseases, but also exercising a decided influence in the rebuilding or regeneration of the diseased tissues.

As an example of the specific application of the new product in the treatment of tuberculosis, a solution of the product, hypodermically injected, resulted in a degeneration and complete disappearance of the tubercular bacilli. In many cases, a beneficial reaction follows from a single injection. The product has no injurious effect on normal tissues, but the reaction is manifested in the diseased tissues by inflammation of the tuberculous areas, which appears during the few weeks following the injection, the period varying in different individual cases, and, in some cases, is accompanied by a material swelling and increased secretion, which, however, is followed by a complete suppression of the bacilli and a regeneration or rebuilding of the diseased parts. The application of the product, as described, to cases involving tuberculosis of the respiratory and digestive tracts, as well as of the glandular organisms, resulted in favorable and marked response in all cases, and, in most cases, was accompanied by a restoration of the affected parts. In all cases of treatment with the product, however, the same appears to be wholly innocuous to sound organisms of the body and produces no deleterious effects thereon.

Apparently the product reacts only when the tuberculosis bacilli are active and the reaction appears to be brought about by a chemical union of the toxin of the bacilli, the resultant compound forming an effective antitoxin which destroys the bacilli and also exercises the beneficial effect of restoring the diseased organisms to a complete and healthy condition. After the destruction of the live virus, all symptoms of tuberculosis disappear. Furthermore, the product appears to exercise a distinct effect in imparting to sound organisms, immunity to or the capacity to resist the germs of tuberculosis and similar diseases, and when injected into the body, it appears to be taken up in the circulation of the blood from which it does not disappear for a long time, so that the subject is immune to attack by germs of the disease as long as the product is retained in the system in appreciable quantities.

Now what I claim and desire to secure by Letters Patent is the following:

1. A process for the manufacture of therapeutically active substances, which process consists in treating bile with an acid, filtering from the precipitated matter and separating in solid form from the filtrate the active substances by addition of alkali, substantially as described.

2. A process for the manufacture of therapeutically active substances, which process consists in treating bile with hydrochloric acid, filtering from the precipitated matter and separating in solid form from the filtrate the active substances by addition of alkali substantially as described.

3. A process for the manufacture of therapeutically active substances, which process consists in treating bile with hydrochloric acid, filtering from the precipitated matter and separating in solid form from the filtrate the active substances by addition of caustic soda lye substantially as described.

4. A process for the manufacture of therapeutically active substances, which process consists in treating bile diluted with water with hydrochloric acid, filtering from the precipitated matter and separating in solid form from the filtrate the active substances by addition of caustic soda lye.

5. As a new article of manufacture the product which is obtained by treating bile with an acid, filtering from the precipitated matter and separating in solid form from the filtrate the active substances by addition of alkali, which product consists of a light brown powder having therapeutical properties substantially as described.

That I claim the foregoing as my invention, I have signed my name in presence of two witnesses, this eleventh day of May 1914.

DR. RICHARD CHRISTIAN WILHELM NÖHRING.

Witnesses:
LEO BERGHOLZ,
PAUL ARRAS.